United States Patent
Koh et al.

(10) Patent No.: US 9,729,472 B2
(45) Date of Patent: Aug. 8, 2017

(54) NETWORK PHYSICAL LINK (PHY) SWITCH SYSTEM

(71) Applicant: TEXAS INSTRUMENTS INCORPORATED, Dallas, TX (US)

(72) Inventors: T-Pinn R. Koh, Allen, TX (US); Yilun Wang, Dallas, TX (US); Maxwell G. Robertson, Dallas, TX (US); Douglas E. Wente, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 375 days.

(21) Appl. No.: 14/300,861

(22) Filed: Jun. 10, 2014

(65) Prior Publication Data
US 2014/0362678 A1    Dec. 11, 2014

Related U.S. Application Data

(60) Provisional application No. 61/833,597, filed on Jun. 11, 2011.

(51) Int. Cl.
*G01R 31/08* (2006.01)
*H04L 12/939* (2013.01)
*H04L 12/931* (2013.01)

(52) U.S. Cl.
CPC .......... *H04L 49/557* (2013.01); *H04L 49/351* (2013.01)

(58) Field of Classification Search
CPC ....................................................... H04L 45/28
See application file for complete search history.

(56) References Cited

U.S. PATENT DOCUMENTS

| | | | |
|---|---|---|---|
| 2001/0034729 A1* | 10/2001 | Azadet | H04L 29/06 |
| 2007/0290909 A1* | 12/2007 | Jungerman | G06F 5/00 341/144 |
| 2013/0089012 A1* | 4/2013 | Schuster | H04L 1/1874 370/310 |
| 2014/0098825 A1* | 4/2014 | Woodruff | H04J 3/047 370/419 |

* cited by examiner

*Primary Examiner* — Samina Choudhry
(74) *Attorney, Agent, or Firm* — Goutham Kondapalli; Charles A. Brill; Frank D. Cimino

(57) ABSTRACT

One example includes network physical link (PHY) switch system. The system includes a multiplexer to output a first of a plurality of data streams that are input to a PHY device in response to a first state of a selection signal. The system also includes a data detector that monitors the first data stream and provides a trigger signal in response to a predetermined condition associated with the first data stream. The system further includes a switching controller that provides the selection signal, and in response to a switching command signal indicating a command to switch from the first data stream to the second data stream, monitors the data detector for the trigger signal and changes the selection signal from the first state to a second state in response to receiving the trigger signal to switch to the second data stream of the plurality of data streams.

19 Claims, 4 Drawing Sheets

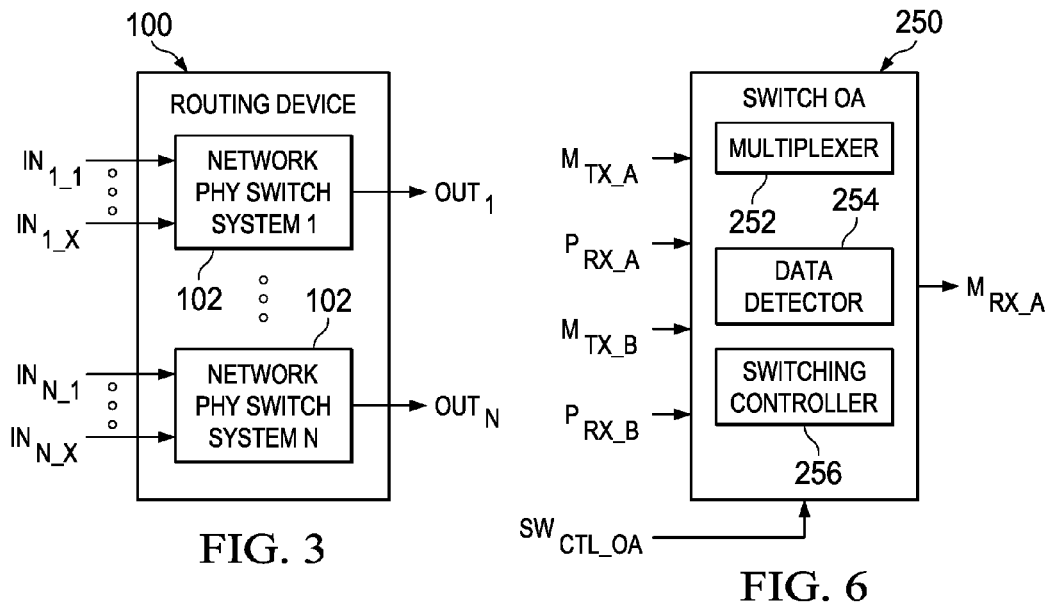
FIG. 3
FIG. 6
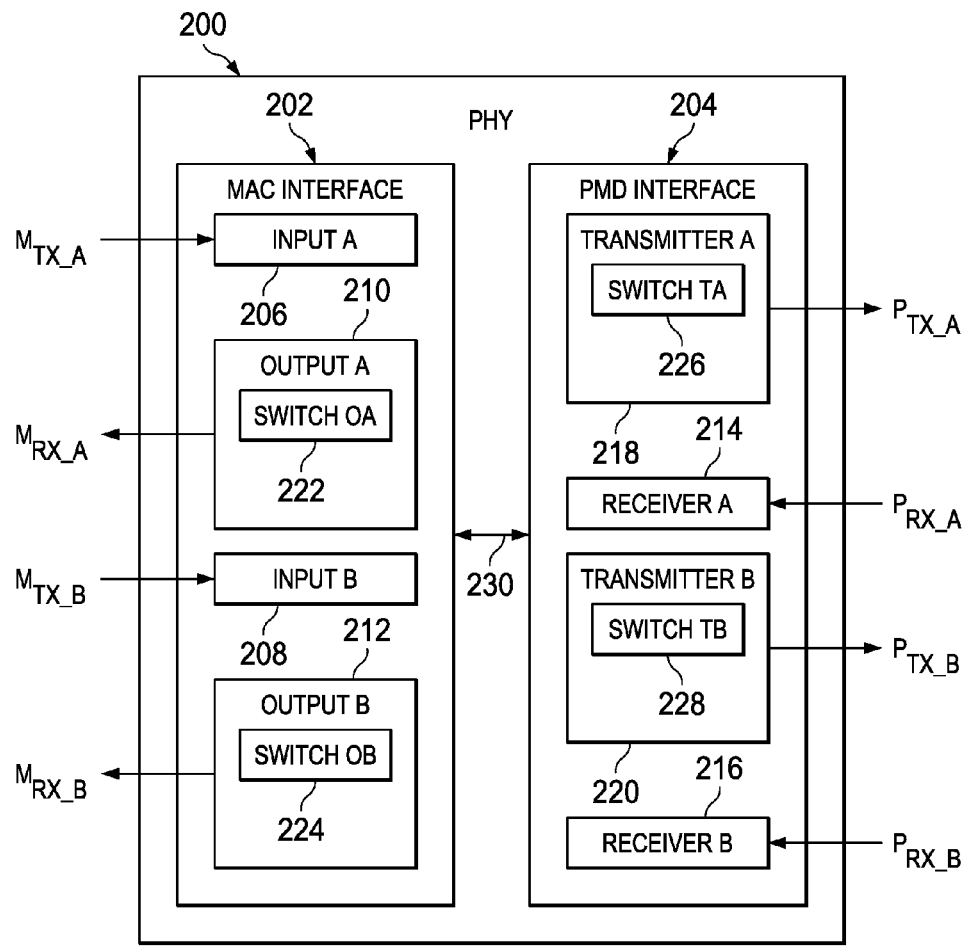
FIG. 5

NETWORK PHYSICAL LINK (PHY) SWITCH SYSTEM

CROSS-REFERENCE TO RELATED APPLICATION

This application claims the benefit of U.S. Provisional Patent Application No. 61/833,597, filed Jun. 11, 2013, and entitled A DATA AWARE SMART PHY SWITCH FOR 10GBASE-KR, which is incorporated herein by reference in its entirety.

TECHNICAL FIELD

This disclosure relates generally to network systems, and more specifically to a network physical link (PHY) switch system.

BACKGROUND

A variety of networks implement switching and/or routing as a means of providing an input data stream to one of several separate outputs to disseminate the input data stream to different devices on the network. Network data switching can be implemented on a variety of different types of networks, such as Ethernet networks that operate via one of a variety of different transport media (e.g., optical fiber and/or copper or a different metal conductor, such as associated with a 10GBase-KR Ethernet). Due to the high-speed transfer of data across a network and to amount of data traffic on the network, it is desirable to implement switching of an input data stream to an output of a routing device as quickly as possible. Rapid switching not only maintains high-speed data transfer, but can also substantially mitigate corruption of data (e.g., data packets) that are transmitted.

SUMMARY

One example includes network physical link (PHY) switch system. The system includes a multiplexer configured to output a first data stream of a plurality of data streams that are input to a PHY device in response to a first state of a selection signal. The system also includes a data detector configured to monitor the first data stream and to provide a trigger signal in response to an occurrence of a predetermined condition associated with the first data stream. The system further includes a switching controller that provides the selection signal, and in response to a switching command signal indicating a command to switch from the first data stream to the second data stream, monitors the data detector for the trigger signal and changes the selection signal from the first state to a second state in response to receiving the trigger signal to switch to the second data stream of the plurality of data streams.

Another embodiment includes a method for switching from a first data stream to a second data stream in a PHY device of a network device. The method includes providing a selection signal in a first state to select the first data stream that is input to the PHY device to be output from a multiplexer. The method also includes receiving a switching control signal that indicates a command to switch from the first data stream to the second data stream. The method also includes monitoring an output of a first-in-first-out (FIFO) buffer to detect a predetermined condition associated with the first data stream. The method also includes providing a trigger signal in response to an occurrence of the predetermined condition. The method further includes providing the selection signal in a second state to switch the input to the PHY device from the first data stream to the second data stream to be output from the multiplexer.

Another embodiment includes crosspoint routing system comprising a PHY device. The PHY device includes a media access control (MAC) interface comprising a MAC interface output configured to transmit a MAC receive signal corresponding to one of a MAC transmit signal and a PHY receive signal to a MAC device via a MAC interface switch. The MAC interface further includes a MAC interface input configured to receive the MAC transmit signal from the MAC device. The PHY device further includes a PMD interface comprising a PMD interface output configured to transmit a PHY transmit signal corresponding to one of the MAC transmit signal and the PHY receive signal to a backplane via a PMD interface switch. The PMD interface further includes a PMD interface input configured to receive the PHY receive signal from the backplane.

BRIEF DESCRIPTION OF THE DRAWINGS

FIG. 3 illustrates an example of a routing device.

FIG. 5 illustrates an example of a PHY device.

FIG. 6 illustrates yet another example of a network PHY switch system.

DETAILED DESCRIPTION

Figure 1:
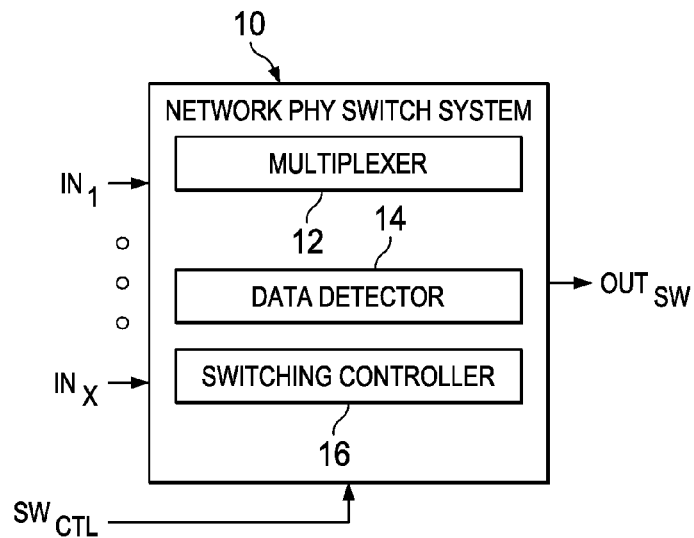
FIG. 1 illustrates an example of a network PHY switch system.

This disclosure relates generally to network systems, and more specifically to a network physical link (PHY) switch system. A network PHY switch system can be implemented in a number of network applications, such as Ethernet (e.g., 10GBase-KR Ethernet). The network PHY switch system can be implemented in a PHY device to implement switching from a first data stream of a plurality of data streams to a second data stream of the plurality of data streams. The plurality of data streams can include inputs to the PHY device from a media access control (MAC) device and/or inputs to the PHY device from an associated backplane, such as in a crosspoint switching router. For example, the crosspoint switching router can include a plurality of ports, with each port including a MAC device and a PHY device. The PHY device can include a network PHY switch system in each of a plurality of outputs to implement PHY switching of the inputs to the PHY device according to one of a plurality of switching modes (e.g., mission mode, crosspoint mode, and/or retime mode).

As an example, the network PHY switch system can include a multiplexer configured to receive each of the plurality of data streams, such as corresponding to each of a plurality of inputs to the associated PHY device. The multiplexer can provide a given one of the data streams at an output based on a first state of a selection signal. The network PHY switch system can also include a data detector that is configured to monitor the data that is output from the multiplexer. For example, the data detector can be configured to monitor the data provided from the multiplexer at an output of a first-in-first-out (FIFO) buffer, such as configured to implement clock time compensation (CTC). The data detector can be configured to generate a trigger signal in response to detecting a predetermined condition associated with the data stream, such as an end of packet condition. That is, the PHY switch system can be data aware based on monitoring the data. The network PHY switch system can also include a switch controller that can generate the selection signal. For example, the switch controller can receive a switching control signal that indicates a command to switch from a first data stream to a second data stream. The switch controller can thus be configured to change the state of the selection signal in response to the trigger signal based on the switching control signal necessitating a change from the first data stream to the second data stream. As an example, the network PHY switch can also include a data mask component that is configured to replace the monitored data stream with dummy data (e.g., idle data or idle pairs) in response to the trigger signal, such as until the data detector detects a beginning of a packet of the second data stream. Therefore, because the switch controller only changes the state of the selection signal in response to the trigger signal, and thus based on the predetermined condition (e.g., end of a packet), packet corruption, which typically occurs in response to switching to a different data source, can be mitigated.

FIG. 1 illustrates an example of a network physical link (PHY) switch system 10. The network PHY switch system 10 can be implemented in a variety of network applications that require routing of data streams from disparate data sources. The network PHY switch system 10 can be implemented in a PHY device (e.g., an integrated circuit (IC)), such as in a router (e.g., a crosspoint routing system). As an example, the network PHY switch system 10 can be implemented in an Ethernet network system, such as in a 10GBase-KR network router.

In the example of FIG. 1, the network PHY switch system 10 is configured to provide an output data stream $OUT_{sw}$ that corresponds to a given one of a plurality X of input data streams, demonstrated in the example of FIG. 1 as $IN_1$ through $IN_X$, where X is a positive integer. The selection of the given one of the input data streams $IN_1$ through $IN_X$ can be set by a switching control signal $SW_{CTL}$, such as provided from an external circuit or device (e.g., a management data input/output (MDIO) device).

In the example of FIG. 1, the network PHY switch system 10 includes a multiplexer 12, a data detector 14, and a switching controller 16. The multiplexer 12 is configured to receive the input data streams $IN_1$ through $IN_X$ and to provide a given one of the input data streams $IN_1$ through $IN_X$ at an output based on the switching controller 16 (e.g., based on a state of a selection signal provided by the switching controller 16). As an example, the switching controller 16 can control which of the input data streams $IN_1$ through $IN_X$ in response to the switching control signal $SW_{CTL}$. The data detector 14 is configured to monitor the given one of the data streams $IN_1$ through $IN_X$ that is provided at the output of the multiplexer 12, and can provide an indication to the switching controller 16 of the occurrence of a predetermined condition associated with the given one of the data streams $IN_1$ through $IN_X$ at the output of the multiplexer 12. As an example, the indication can be a trigger signal that is indicative of the predetermined condition. For example, the predetermined condition can correspond to an end of a packet of the first of the input data streams $IN_1$ through $IN_X$, and/or can correspond to one of a plurality of other types of conditions associated with the given one of the data streams $IN_1$ through $IN_X$. Thus, the switching controller 16 can be programmed to switch from a first of the input data streams $IN_1$ through $IN_X$ to a second of the input data streams $IN_1$ through $IN_X$ based on the predetermined condition, such as to mitigate packet corruption of the data in the output data stream $OUT_{SW}$.

As an example, the switching controller 16 can provide a selection signal at a first state to the multiplexer 12 to provide a first of the input data streams $IN_1$ through $IN_X$ at the output of the multiplexer 12, and thus as the output data stream $OUT_{SW}$. The switching control signal $SW_{CTL}$ can indicate a command to switch from the first of the input data streams $IN_1$ through $IN_X$ to a second of the input data streams $IN_1$ through $IN_X$. In response, the data detector 14 can monitor the first of the input data streams $IN_1$ through $IN_X$ at the output of the multiplexer 12 for the predetermined condition (e.g., an end of a packet of the first of the input data streams $IN_1$ through $IN_X$ or a variety of other predetermined data patterns or conditions). In response to detecting the predetermined condition, the data detector 14 can provide indication of the occurrence of the predetermined condition (e.g., via a trigger signal) to the switching controller 16. As a result of switching in response to the predetermined condition, the network PHY switch system provides switching in a manner that is data-aware, such as to preserve the integrity of the data that is provided as the output data stream $OUT_{SW}$. Thus, in response to the indication of the occurrence of the predetermined condition, the switching controller 16 can change the state of the selection signal, thus switching the multiplexer 12 from the first of the input data streams $IN_1$ through $IN_X$ to another of the input data streams $IN_1$ through $IN_X$ to be provided at the output of the multiplexer 12, namely, as the output data stream $OUT_{SW}$.

Figure 2:
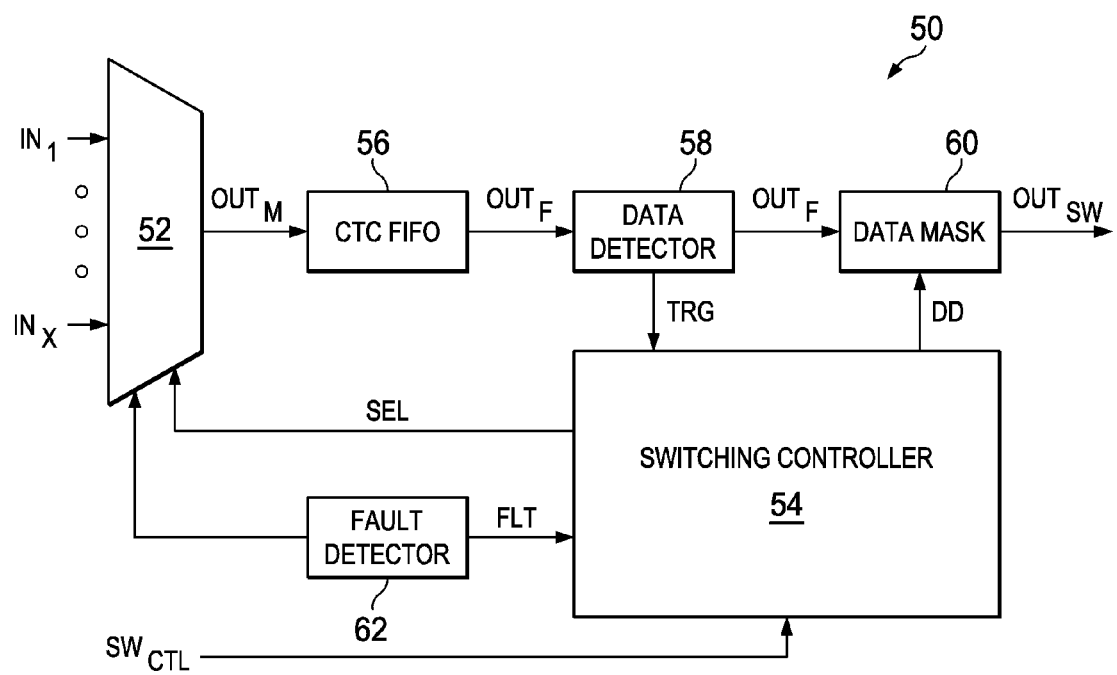
FIG. 2 illustrates another example of a network PHY switch system.

FIG. 2 illustrates another example of a network PHY switch system 50. The network PHY switch system 50 can be implemented in a variety of network applications that require routing of data streams from disparate data sources. The network PHY switch system 50 can be implemented in a PHY device such as in a crosspoint routing system. As an example, the network PHY switch system 50 can be implemented in an Ethernet network system, such as in a 10GBase-KR network router, such as residing between 10GBit Media Independent Interface (XGMII) and a KR physical coding sublayer (PCS) interface. As an example, the network PHY switch system 50 can correspond to the network PHY switch system 10 in the example of FIG. 1.

In the example of FIG. 2, the network PHY switch system 50 is configured to provide an output data stream $OUT_{SW}$ that corresponds to a given one of the plurality of input data streams $IN_1$ through $IN_X$ that are provided to a multiplexer 52. As an example, the input data streams $IN_1$ through $IN_X$ can correspond to inputs provided from a physical medium dependent (PMD) interface and/or a media access control (MAC) interface in the associated PHY device. The selection of the given one of the input data streams $IN_1$ through $IN_X$ via the multiplexer 52 can be set by a switching controller 54 in response to a switching control signal $SW_{CTL}$, such as provided from an external circuit or device (e.g., a management data input/output (MDIO) device). In the example of FIG. 2, the switching controller 54 provides a selection signal SEL having a state that corresponds to a given one of the input data streams $IN_1$ through $IN_X$ that is to be provided as a data stream $OUT_M$ at an output of the multiplexer 52. The data stream $OUT_M$ is provided to a clock time compensation (CTC) first-in-first-out (FIFO) buffer 56 that is configured to queue the data stream $OUT_M$ and to provide the data stream $OUT_M$ as a clock time compensated output stream $OUT_F$. For example, the input data streams $IN_1$ through $IN_X$ can be provided in asynchronous clock domains, such that the CTC FIFO 56 can provide the clock time compensation to provide the clock time compensated data stream $OUT_F$ substantially continuously. Additionally, because the asynchronous input data streams $IN_1$ through $IN_X$ are multiplexed via the multiplexer 52 upstream of the CTC FIFO 56, the network PHY switch system 50 can be implemented in a more compact circuit design, as opposed to typical switching systems that implement non-PHY device switching.

The clock time compensated data stream $OUT_F$ is provided to a data detector 58. The data detector 58 is configured to monitor the clock time compensated data stream $OUT_F$ to provide an indication to the switching controller 54 of the occurrence of a predetermined condition associated with the clock time compensated data stream $OUT_F$. As an example, the predetermined condition can correspond to an end of a packet of the clock time compensated data stream $OUT_F$, can correspond to a programmable character or ordered set, or can correspond to any of a variety of data and/or data pattern in the clock time compensated data stream $OUT_F$. In the example of FIG. 2, the data detector 58 is configured to provide a trigger signal TRG to the switching controller 54 that is indicative of the predetermined condition. Thus, the switching controller 54 is programmed to switch the state of the selection signal SEL from a first of the input data streams $IN_1$ through $IN_X$ to a second of the input data streams $IN_1$ through $IN_X$ in response to the trigger signal TRG based on an indication of a switch from the first of the input data streams $IN_1$ through $IN_X$ to the second of the input data streams $IN_1$ through $IN_X$ provided by the switching control signal $SW_{CTL}$.

The network PHY switch system 50 also includes a data mask component 60 that receives the clock time compensated data stream $OUT_F$. The data mask component 60 can be configured, for example, as logic that is configured to replace the clock time compensated data stream $OUT_F$ with dummy data DD that is provided by the switching controller 54 in response to the trigger signal TRG, and thus the switching from the first of the input data streams $IN_1$ through $IN_X$ to the second of the input data streams $IN_1$ through $IN_X$ via the selection signal SEL. As an example, the dummy data DD can correspond to predetermined idle data or idle pairs (e.g., such as generated by the switching controller 54 or from an associated MDIO). Thus, in response to the indication of the predetermined condition provided by the trigger signal TRG (e.g., end of a packet), the data mask 60 can discard the data in the clock time compensated data stream $OUT_F$ subsequent to the predetermined condition and provide the output data stream $OUT_{SW}$ as the dummy data DD.

The data detector 58 can also be configured to provide a detection signal in response to detecting a predetermined condition associated with the clock time compensated data stream $OUT_F$, such as associated with the corresponding second of the input data streams $IN_1$ through $IN_X$, via the trigger signal TRG. For example, the data detector 58 can provide a detector output to deactivate the trigger signal TRG in response to detecting a beginning of the second of the input data streams $IN_1$ through $IN_X$ (e.g., a start of a first packet) in the clock time compensated data stream $OUT_F$. In response, the switching controller 54 can deactivate the data mask component 60, such that the data mask component 60 no longer replaces the clock time compensated data stream $OUT_F$ with dummy data DD, but instead allows the clock time compensated data stream $OUT_F$ to pass through the data mask component 60 as the output data stream $OUT_{SW}$. As a result, based on the switching controller 54 delaying switching of the first of the input data streams $IN_1$ through $IN_X$ to the second of the input data streams $IN_1$ through $IN_X$ until the trigger signal TRG is provided, and thus until the predetermined condition has occurred and during which time the output data stream $OUT_{SW}$ is provided as the dummy data DD, the network PHY switch system 50 can substantially mitigate corruption of the output data stream $OUT_{SW}$ that can result from the switching between different streams. Additionally, because the switching is implemented in a PHY device, as opposed to a MAC device, resources of the associated MAC device can be relegated to other functions for more efficient operation of the MAC device. Furthermore, as described in greater detail herein, the switching from one of the input data streams $IN_1$ through $IN_X$ to another of the input data streams $IN_1$ through $IN_X$ that are associated with PMD interface inputs can be implemented very rapidly (e.g., less than 100 nanoseconds) based on maintaining the input data streams $IN_1$ through $IN_X$ on the PCS interface, thus providing the switching absent a need for retraining of the associated links (e.g., KR links) to a different PCS interface.

Additionally, the network PHY switch system 50 includes a fault detector 62 that is configured to detect link faults associated with the data stream $OUT_M$ that is provided from the multiplexer 52. As an example, the link faults can correspond to a loss of signal fault, a loss of KR block lock fault, a KR 64/66B decoding error fault, or a variety of other faults. The fault detector 62 can, in response to detecting a fault associated with the data stream $OUT_M$, provide a fault signal FLT to the switching controller 54. In response to the fault signal FLT, the switching controller 54 can change the state of the select signal SEL to switch from a current one of the input data streams $IN_1$ through $IN_X$ that has a detected fault associated with it to a second one of the input data streams $IN_1$ through $IN_X$. As an example, the switching controller 54 can provide the switching from the faulted one of the input data streams $IN_1$ through $IN_X$ to another of the input data streams $IN_1$ through $IN_X$ based on a programmable condition, such as detected by the data detector 58. In other examples, dummy data can be switched to dummy data DD in response to the fault signal FLT. Therefore, the trigger signal TRG can also provide an indication of when to change the state of the selection signal SEL in response to the fault signal FLT, such as based on KR fault signaling, between packets, immediately, or in response to any of a variety of other conditions.

FIG. 3 illustrates an example of a routing device 100. The routing device 100 can correspond to a routing device provided in a PHY device and configured to route each of a plurality of sets of input data streams to a respective one of a plurality of outputs. In the example of FIG. 3, a plurality N of sets of input data streams are provided to the routing device 100, with each of the plurality N of data streams including a plurality X of data streams, where N and X are each positive integers. While the example of FIG. 3 demonstrates that each of the N sets of data streams includes X data streams, it is to be understood that each of the N sets of data streams can include a different number of data streams relative to each other, and are not limited to having an equal number of data streams (e.g., a quantity X). Thus, the data streams are demonstrated in the example of FIG. 3 as including a first set of data streams $IN_{1\_1}$ through $IN_{1\_X}$ through an Nth set of data streams $IN_{N\_1}$ through $IN_{N\_X}$. As an example, each of the N sets of data streams $IN_1$ through $IN_X$ can correspond to an input port associated with the routing device 100. As another example, the routing device 100 can correspond to a single port of a larger routing system, such that the routing device 100 can correspond to one of a plurality of ports of the larger routing system.

The routing device 100 includes a plurality N of network PHY switch systems 102, each corresponding to a given one of the N sets of the data streams $IN_1$ through $IN_X$. Each of the network PHY switch systems 102 provides a respective output data stream, demonstrated as $OUT_1$ through $OUT_N$, respectively. Each of the network PHY switch systems 102 can be configured substantially similar to the network PHY switch system 50 in the example of FIG. 2. Therefore, each of the network PHY switch systems 102 can include a multiplexer 52, a switching controller 54, a CTC FIFO 56, a data detector 58, a data mask component 60, and/or a fault detector 62 to implement PHY switching of a given one of the data streams $IN_1$ through $IN_X$ to the respective output stream OUT, similar to as described previously. As an example, the routing device 100 can include a plurality of switch controllers 54 that are each associated with a respective one of the network PHY switch systems 102, or can include a single switch controller 54 that is configured to receive a plurality of switching control signals $SW_{CTL}$ and to provide a plurality of selection signals SEL to a respective plurality of multiplexers 52 associated with the respective network PHY switch systems 102.

As an example, the routing device 100 can be implemented in an Ethernet routing system, such as in a redundant crosspoint routing system. Additionally, the routing device 100 can include a plurality of additional circuit devices, such as an MDIO to control the switching of the N sets of data streams $IN_1$ through $IN_X$ to the respective output streams $OUT_1$ through $OUT_N$. Furthermore, the routing device 100 can be configured in a crosspoint mode, such that a given data stream $IN_1$ through $IN_X$ can be switched as an output OUT from a different one of the network PHY switch systems 102, or in a retime mode, such that a given one of the output streams $OUT_1$ through $OUT_N$ can be provided as one of the input data streams $IN_1$ through $IN_X$ in one of the network PHY switch systems 102. Accordingly, the routing device 100 can be configured in a variety of ways.

Figure 4:
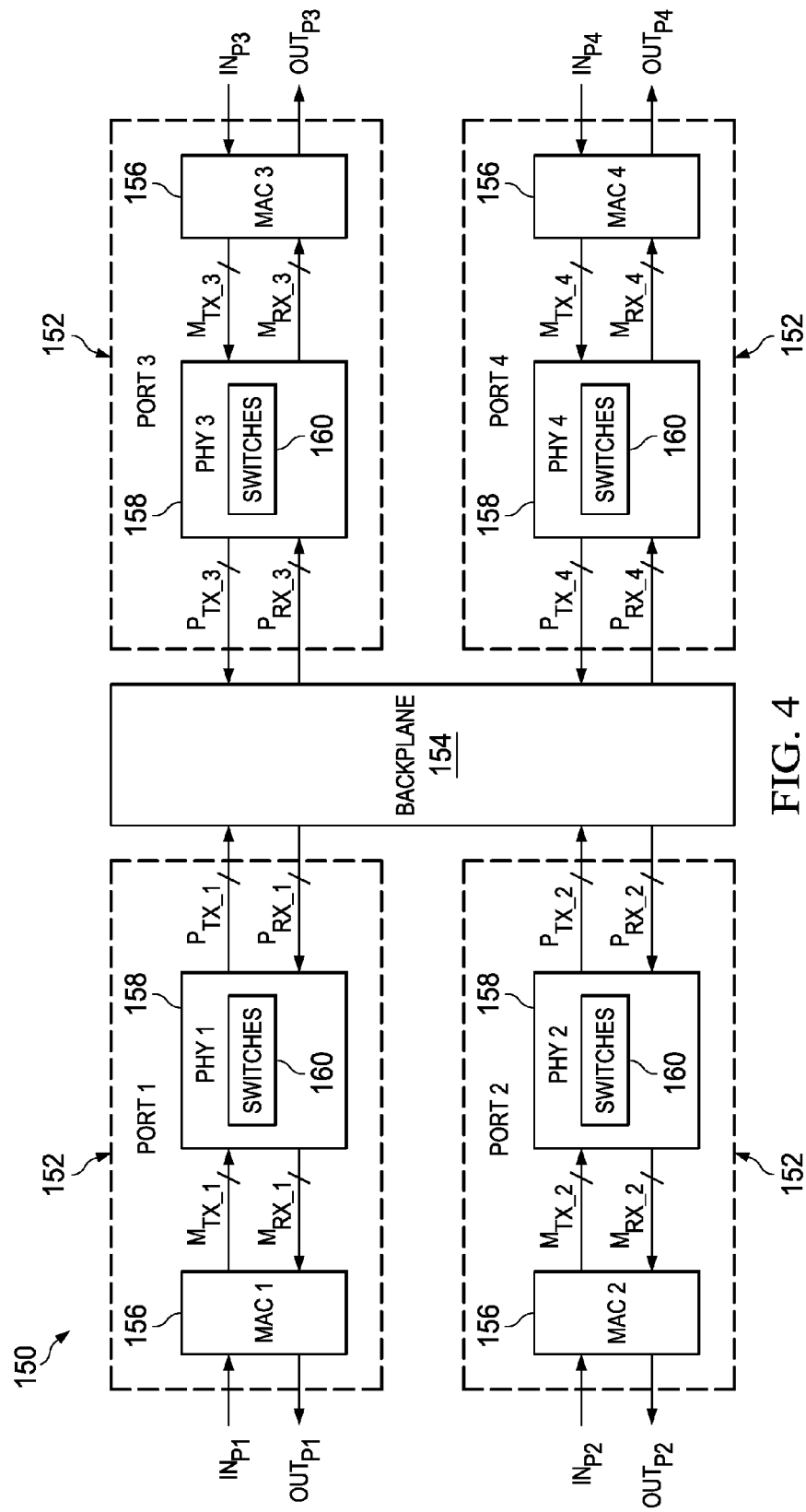
FIG. 4 illustrates an example of a crosspoint routing system.

FIG. 4 illustrates an example of a crosspoint routing system 150. As an example, the crosspoint routing system 150 can correspond to a 10GBase-KR network routing system. The crosspoint routing system 150 includes a plurality of ports 152, demonstrated as four ports PORT 1, PORT 2, PORT 3, and PORT 4 in the example of FIG. 4. Each of the ports 152 receives an input, demonstrated as $IN_{P1}$, $IN_{P2}$, $IN_{P3}$, and $IN_{P4}$, respectively, and provides an output, demonstrated as $OUT_{P1}$, $OUT_{P2}$, $OUT_{P3}$, and $OUT_{P4}$, respectively. As an example, each of the ports 152 can be coupled to a device on an associated network (e.g., computer, server, or other routing device). Each of the ports 152 are coupled to a common backplane 154, such as based on copper or other electrically conductive material, such as in a KR network configuration.

Each of the ports 152 includes a MAC device 156 and a PHY device 158. The MAC device 156 receives the respective input INP and provides the respective output $OUT_P$, such as from and to a respective device on the associated network. The MAC device 156 is configured to provide MAC transmit signals $M_{TX}$ to the respective PHY device 158, and to receive respective MAC receive signals $M_{RX}$ from the respective PHY device 158. Similarly, the PHY device 158 is configured to provide PHY transmit signals $P_{TX}$ to the backplane 154 and to receive PHY receive signals $P_{RX}$ from the backplane 154. In the example of FIG. 4, each of the PHY devices 158 in each of the respective ports 152 includes a set of network PHY switch systems 160 that are configured to switch one or more of the MAC transmit signals $M_{TX}$ and/or one or more of the PHY receive signals $P_{RX}$ to one of a plurality of outputs, such as associated with the associated MAC receive signals $M_{RX}$ and/or the PHY transmit signals $P_{TX}$. As described herein, the terms "receive" and "transmit" are used with respect to the respective device of which they are associated. For example, the MAC transmit signals $M_{TX}$ are transmitted from the MAC device 156 and the MAC receive signals are received by the MAC device 156, and the PHY transmit signals $P_{TX}$ are transmitted from the PHY device 158 and the PHY receive signals are received by the PHY device 158.

As an example, the PHY device 158 associated with each of the ports 152 can include a plurality of network PHY switch systems 160 that are each associated with a given output of the PHY device 158. Each of the network PHY switch systems 160 can be configured substantially similar to the network PHY switch system 50 in the example of FIG. 2. For example, the PHY device 158 can include at least one output associated with a respective at least one of the MAC receive signals $M_{RX}$ and at least one output associated with a respective at least one of the PHY transmit signals $Pr_{TX}$. Therefore, the network PHY device 158 in a given one of the ports 152 can be configured to switch a given one of the MAC transmit signals $M_{TX}$ or a given one of the PHY receive signals $P_{RX}$ to any of the outputs of the PHY device 158 in any of a variety of switching modes (e.g., mission mode, crosspoint mode, and/or retime mode). Thus, a given one of the MAC transmit signals $M_{TX}$ or a given one of the PHY receive signals $P_{RX}$ can be provided as one of the MAC receive signals $M_{RX}$ that is provided to the respective MAC device 156 or as one of the PHY transmit signals $Pr_{TX}$ that is provided to the backplane 154.

FIG. 5 illustrates an example of a PHY device 200. The PHY device 200 can correspond to a PHY device 158 associated with a given one of the ports 152 in the crosspoint routing system 150 in the example of FIG. 4. Therefore, reference is to be made to the example of FIG. 4 in the following description of the example of FIG. 5 for additional context.

The PHY device 200 includes a MAC interface 202 and a physical medium dependent (PMD) interface 204. The MAC interface 202 includes a first MAC interface input 206 and a second MAC interface input 208, demonstrated in the example of FIG. 5 as INPUT A and INPUT B, respectively, and includes a first MAC interface output 210 and a second MAC interface output 212, demonstrated in the example of FIG. 5 as OUTPUT A and OUTPUT B. The first and second MAC interface inputs 206 and 208 are configured to receive a MAC transmit signal $M_{TX\_A}$ and a MAC transmit signal $M_{TX\_B}$, respectively, from a MAC device (e.g., the MAC device 156 in a given port 152), and the first and second MAC interface outputs 210 and 212 are configured to transmit a MAC receive signal $M_{RX\_A}$ and a MAC receive signal $M_{RX\_B}$, respectively, to the MAC device. As an example, the MAC interface 202 can be configured to operate via a serializer/deserializer (SerDes) at a first data rate. For example, the MAC interface 202 can operate via a 10 Attachment Unit Interface (XAUI), and thus to provide each of the MAC receive signals $M_{RX\_A}$ and $M_{RX\_B}$ and to receive each of the MAC transmit signals $M_{TX\_A}$ and $M_{TX\_B}$ as four differential pairs.

Similarly, the PMD interface 204 includes a first PMD interface receiver 214 and a second PMD interface receiver 216, demonstrated in the example of FIG. 5 as RECEIVER A and RECEIVER B, respectively, and includes a first PMD interface transmitter 218 and a second PMD interface transmitter 220, demonstrated in the example of FIG. 5 as TRANSMITTER A and TRANSMITTER B. The first and second PMD interface receivers 214 and 216 are configured to receive a PHY receive signal $P_{RX\_A}$ and a PHY receive signal $P_{RX\_B}$, respectively, from a backplane (e.g., the backplane 154), and the first and second PMD interface transmitter 218 and 220 are configured to transmit a PHY transmit signal $P_{TX\_A}$ and a PHY transmit signal $P_{TX\_B}$, respectively, to the backplane. As an example, the PMD interface 204 can be configured to operate via a SerDes at a second data rate that is faster than the first data rate associated with the MAC interface 202. For example, the PMD interface 204 can operate via XGMII, and thus to provide each of the PHY transmit signals $P_{TX\_A}$ and $P_{TX\_B}$ and to receive each of the PHY receive signals $P_{RX\_A}$ and $P_{RX\_B}$ as single conductor serial signals.

In the example of FIG. 5, the first MAC interface output 210 includes a network PHY switch system 222, demonstrated as SWITCH OA, and the second MAC interface output 212 includes a network PHY switch system 224, demonstrated as SWITCH OB. Similarly, the first PMD interface transmitter 218 includes a network PHY switch system 226, demonstrated as SWITCH TA, and the second PMD interface transmitter 220 includes a network PHY switch system 228, demonstrated as SWITCH TB. As an example, each of the network PHY switch systems 222, 224, 226, and 228 can be configured substantially similar to the network PHY switch system 50 in the example of FIG. 2. For example, each of the network PHY switch systems 222, 224, 226, and 228 can be configured to receive at a multiplexer (e.g., the multiplexer 52) each of the MAC transmit signals $M_{TX\_A}$ and $M_{TX\_B}$ and the PHY receive signals $P_{RX\_A}$ and $P_{RX\_B}$ as respective separate input data streams (e.g., corresponding to the input data streams $IN_1$ through $IN_X$). Thus, the network PHY switch systems 222 and 224 can output a data stream that is converted from the second data rate (e.g., in a mission or crosspoint mode) to the first data rate to provide the respective MAC receive signals $M_{RX\_A}$ and $M_{RX\_B}$ as one of the PHY receive signals $P_{RX\_A}$ and $P_{RX\_B}$, as demonstrated by the arrow 230. Similarly, the network PHY switch systems 226 and 228 can output a data stream that is converted from the first data rate to the second data rate (e.g., in a mission or crosspoint mode) to provide the respective PHY transmit signals $P_{TX\_A}$ and $P_{TX\_B}$ as one of the MAC transmit signals $M_{TX\_A}$ and $M_{TX\_B}$, as demonstrated by the arrow 230.

For example, the network PHY switch system 222 can provide the MAC receive signal $M_{RX\_A}$ as corresponding to one of the MAC transmit signals $M_{TX\_A}$ and $M_{TX\_B}$ and PHY receive signals $P_{RX\_A}$ and $P_{RX\_B}$, and the network PHY switch system 224 can provide the MAC receive signal $M_{RX\_B}$ as corresponding to one of the MAC transmit signals $M_{TX\_A}$ and $M_{TX\_B}$ and PHY receive signals $P_{RX\_A}$ and $P_{RX\_B}$. Similarly, the network PHY switch system 226 can provide the PHY transmit signal $P_{TX\_A}$ as corresponding to one of the MAC transmit signals $M_{TX\_A}$ and $M_{TX\_B}$ and PHY receive signals $P_{RX\_A}$ and $P_{RX\_B}$, and the network PHY switch system 224 can provide the PHY transmit signal $P_{TX\_B}$ as corresponding to one of the MAC transmit signals $M_{TX\_A}$ and $M_{TX\_B}$ and PHY receive signals $P_{RX\_A}$ and $P_{RX\_B}$. Therefore, each of the network PHY switch systems 222, 224, 226, and 228 can provide selective switching of any of the inputs to the PHY device 200 as the respective outputs corresponding to the MAC receive signals $M_{RX\_A}$ and $M_{RX\_B}$ and the PHY transmit signals $P_{TX\_A}$ and $P_{TX\_B}$ in a variety of modes.

FIG. 6 illustrates yet another example of a network PHY switch system 250. The network PHY switch system 250 can correspond to the network PHY switch system 222 in the example of FIG. 5. Thus, the network PHY switch system 250 can be implemented in the PHY device 200, such as in the crosspoint routing system 150 in the example of FIG. 4. In the example of FIG. 6, the network PHY switch system 250 is configured to provide the MAC receive signal $M_{RX\_A}$ as an output data stream that corresponds to a given one of a plurality of input data streams corresponding to the MAC transmit signal $M_{TX\_A}$, the MAC transmit signal $M_{TX\_B}$, the PHY receive signal $P_{RX\_A}$, and the PHY receive signal $P_{RX\_B}$. The selection of the given one of the input data streams $M_{TX\_A}$, $M_{TX\_B}$, $P_{RX\_A}$, and $P_{RX\_B}$ can be set by a switching control signal $SW_{CTL\_OA}$, such as provided from an external circuit or device (e.g., an MDIO device).

In the example of FIG. 6, the network PHY switch system 250 includes a multiplexer 252, a data detector 254, and a switching controller 256. The multiplexer 252 is configured to receive the input data streams and to provide a given one of the input data streams $M_{TX\_A}$, $M_{TX\_B}$, $P_{RX\_A}$, and $P_{RX\_B}$ at an output based on the switching controller 256 (e.g., based on a state of a selection signal SEL provided by the switching controller 256). As an example, the switching controller 256 can control which of the input data streams $M_{TX\_A}$, $M_{TX\_B}$, $P_{RX\_A}$, and $P_{RX\_B}$ in response to the switching control signal $SW_{CTL\_OA}$. The data detector 254 is configured to monitor the given one of the data streams $M_{TX\_A}$, $M_{TX\_B}$, $P_{RX\_A}$, and $P_{RX\_B}$ that is provided at the output of the multiplexer 252, and can provide an indication (e.g., via the trigger signal TRG) to the switching controller 256 of the occurrence of a predetermined condition (e.g., end of a packet or another condition, such as a fault condition) associated with the given one of the data streams $M_{TX\_A}$, $M_{TX\_B}$, $P_{RX\_A}$, or $P_{RX\_B}$ that is provided at the output of the multiplexer 252. As an example, the indication can be the trigger signal TRG that is indicative of the predetermined condition. Thus, the switching controller 256 can be programmed to switch from one of the input data streams $M_{TX\_A}$, $M_{TX\_B}$, $P_{RX\_A}$, and $P_{RX\_B}$ to a second of the input data streams $M_{TX\_A}$, $M_{TX\_B}$, $P_{RX\_A}$, and $P_{RX\_B}$ based on occurrence of the predetermined condition, such as to mitigate packet corruption of the data in the output data stream $M_{RX\_A}$.

Therefore, the network PHY switch system 250 is configured to provide switching between the input data streams $M_{TX\_A}$, $M_{TX\_B}$, $P_{RX\_A}$, and $P_{RX\_B}$ in a variety of modes. For example, the network PHY switch system 250 can provide the input data stream $P_{RX\_A}$ as the output data stream $M_{RX\_A}$ based on a first state of the selection signal SEL in a mission mode, and can provide the input data stream $P_{RX\_B}$ as the output data stream $M_{RX\_A}$ based on a second state of the selection signal SEL in a crosspoint mode. As another example, the network PHY switch system 250 can provide the input data stream $M_{TX\_A}$ as the output data stream $M_{RX\_A}$ based on a third state of the selection signal SEL in a first retime mode, and can provide the input data stream $M_{TX\_B}$ as the output data stream $M_{RX\_A}$ based on a fourth state of the selection signal SEL in a second retime mode. In the retime modes, the associated PHY device (e.g., the PHY device 200) that includes the network PHY switch system 250 does not need to convert the data rates of the respective input data streams $M_{TX\_A}$ and $M_{TX\_B}$, and can thus provide the switching between the respective input data streams $M_{TX\_A}$ and $M_{TX\_B}$ more rapidly.

Figure 7:
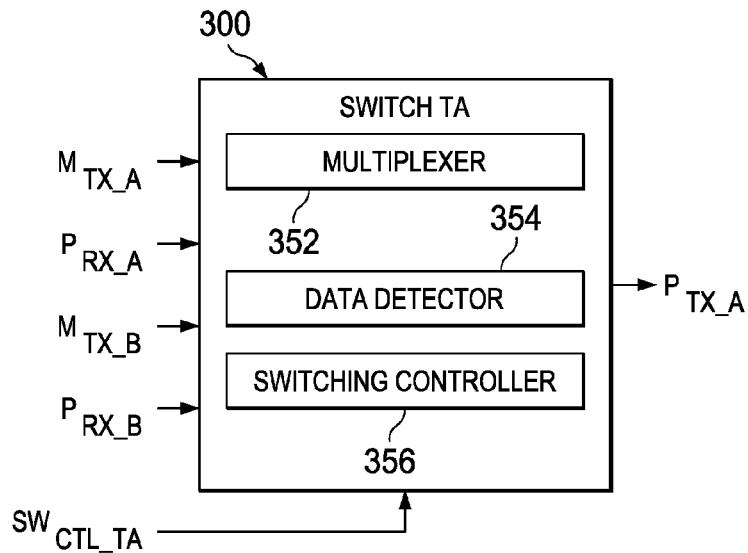
FIG. 7 illustrates a further example of a network PHY switch system.

FIG. 7 illustrates a further example of a network PHY switch system 300. The network PHY switch system 300 can correspond to the network PHY switch system 226 in the example of FIG. 5. Thus, the network PHY switch system 300 can be implemented in the PHY device 200, such as in the crosspoint routing system 150 in the example of FIG. 4. In the example of FIG. 7, the network PHY switch system 300 is configured to provide the PHY transmit signal $P_{TX\_A}$ as an output data stream that corresponds to a given one of a plurality of input data streams corresponding to the MAC transmit signal $M_{TX\_A}$, the MAC transmit signal $M_{TX\_B}$, the PHY receive signal $P_{RX\_A}$, and the PHY receive signal $P_{RX\_B}$. The selection of the given one of the input data streams $M_{TX\_A}$, $M_{TX\_B}$, $P_{RX\_A}$, and $P_{RX\_B}$ can be set by a switching control signal $SW_{CTL\_T4}$, such as provided from an external circuit or device (e.g., an MDIO device).

In the example of FIG. 7, the network PHY switch system 300 includes a multiplexer 302, a data detector 304, and a switching controller 306. The multiplexer 302 is configured to receive the input data streams and to provide a given one of the input data streams $M_{TX\_A}$, $M_{TX\_B}$, $P_{RX\_A}$, and $P_{RX\_B}$ at an output based on the switching controller 306 (e.g., based on a state of a selection signal SEL provided by the switching controller 306). As an example, the switching controller 306 can control which of the input data streams $M_{TX\_A}$, $M_{TX\_B}$, $P_{RX\_A}$, and $P_{RX\_B}$ in response to the switching control signal $SW_{CTL\_T4}$. The data detector 304 is configured to monitor the given one of the data streams $M_{TX\_A}$, $M_{TX\_B}$, $P_{RX\_A}$, and $P_{RX\_B}$ that is provided at the output of the multiplexer 302, and can provide an indication (e.g., via the trigger signal TRG) to the switching controller 306 of the occurrence of a predetermined condition (e.g., end of a packet or another condition, such as a fault condition) associated with the given one of the data streams $M_{TX\_A}$, $N_{TX\_B}$, $P_{RX\_A}$, or $P_{RX\_B}$ at the output of the multiplexer 302. As an example, the indication can be the trigger signal TRG that is indicative of the predetermined condition. Thus, the switching controller 306 can be programmed to switch from one of the input data streams $M_{TX\_A}$, $M_{TX\_B}$, $P_{RX\_A}$, and $P_{RX\_B}$ to a second of the input data streams $M_{TX\_A}$, $M_{TX\_B}$, $P_{RX\_A}$, and $P_{RX\_B}$ based on occurrence of the predetermined condition, such as to mitigate packet corruption of the data in the output data stream $P_{TX\_A}$.

Therefore, the network PHY switch system 300 is configured to provide switching between the input data streams $M_{TX\_A}$, $M_{TX\_B}$, $P_{RX\_A}$, and $P_{RX\_B}$ in a variety of modes. For example, the network PHY switch system 300 can provide the input data stream $M_{TX\_A}$ as the output data stream $P_{TX\_A}$ based on a first state of the selection signal SEL in a mission mode, and can provide the input data stream $M_{TX\_B}$ as the output data stream $P_{TX\_A}$ based on a second state of the selection signal SEL in a crosspoint mode. As another example, the network PHY switch system 300 can provide the input data stream $P_{RX\_A}$ as the output data stream $P_{TX\_A}$ based on a third state of the selection signal SEL in a first retime mode, and can provide the input data stream $P_{RX\_B}$ as the output data stream $P_{TX\_A}$ based on a fourth state of the selection signal SEL in a second retime mode. In the retime modes, the associated PHY device (e.g., the PHY device 200) that includes the network PHY switch system 300 does not need to convert the data rates of the respective input data streams $P_{RX\_A}$ and $P_{RX\_B}$, and can thus provide the switching between the respective input data streams $P_{RX\_A}$ and $P_{RX\_B}$ more rapidly. For example, in the example of FIG. 7, in the retime modes, the KR physical link remains intact in providing one of the input data streams $P_{RX\_A}$ and $P_{RX\_B}$ as the output data stream $P_{TX\_A}$, such that KR link training is not re-initiated as a result of switching.

Figure 8:
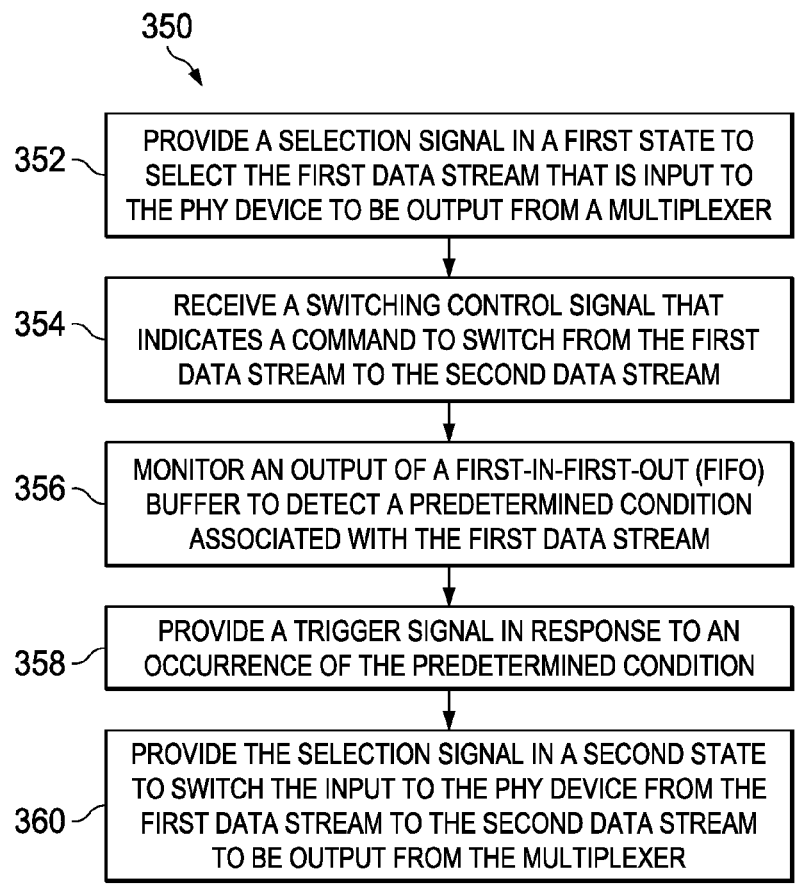
FIG. 8 illustrates an example of a method for switching from a first data stream to a second data stream in a PHY device of a network device.

In view of the foregoing structural and functional features described above, a method in accordance with various aspects of the present invention will be better appreciated with reference to FIG. 8. While, for purposes of simplicity of explanation, the method of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention.

FIG. 8 illustrates an example of a method 350 for switching from a first data stream (e.g., a first of the input data streams $IN_1$ through $IN_X$) to a second data stream (e.g., a second of the input data streams $IN_1$ through $IN_X$) in a PHY device (e.g., the PHY device 200) of a network device (e.g., the crosspoint routing system 150). At 352, a selection signal (e.g., the selection signal SEL) is provided in a first state to select the first data stream that is input to the PHY device to be output from a multiplexer (e.g., the multiplexer 52). At 354, a switching control signal (e.g., the switching control signal $SW_{CTL}$) that indicates a command to switch from the first data stream to the second data stream is received. At 356, an output of a FIFO (e.g., the CTC FIFO 56) buffer is monitored to detect a predetermined condition (e.g., an end of a packet) associated with the first data stream. At 358, a trigger signal (e.g., the trigger signal TRG) is provided in response to an occurrence of the predetermined condition. At 360, the selection signal is provided in a second state to switch the input to the PHY device from the first data stream to the second data stream to be output from the multiplexer.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A network physical link (PHY) switch system comprising:
   a multiplexer configured to output a first data stream of a plurality of data streams that are input to a PHY device in response to a first state of a selection signal;
   a data detector configured to monitor the first data stream and to provide a trigger signal in response to detecting an occurrence of a predetermined condition associated with the first data stream; and
   a switching controller configured to provide the selection signal in one of the first state and a second state, and, in response to receiving a switching command signal that indicates a command to switch from the first data stream to a second data stream of the plurality of data streams, is configured to monitor the data detector for the trigger signal and to change the selection signal from the first state to the second state in response to receiving the trigger signal to switch from the first data stream to the second data stream, wherein the first data stream and the second data stream correspond to one of a plurality of MAC transmit signals provided to the PHY device from a media access control (MAC) device or one of a plurality of PHY receive signals provided to the PHY device from a backplane to which the PHY device is connected.

2. The system of claim 1, further comprising a data mask component configured to discard the first data stream and to insert dummy data in place of the discarded first data stream in response to the trigger signal, wherein the data detector is further configured to deactivate the trigger signal in response to a predetermined condition associated with the second data stream to enable the second data stream to pass through the data mask component.

3. The system of claim 1, wherein the predetermined condition associated with the first data stream corresponds to an end of a packet associated with the first data stream.

4. The system of claim 1, further comprising a clock tolerance compensation (CTC) first-in-first-out (FIFO) buffer coupled to the output of the multiplexer, the CTC FIFO being configured to buffer the first data stream during the first state of the selection signal and to buffer the second data stream during the second state of the selection signal.

5. The system of claim 1, further comprising a fault detection component configured to detect a link fault associated with the first data stream and to indicate the link fault to the switching controller to switch from the first data stream to the second data stream via the selection signal.

6. An Ethernet routing system comprising the network PHY switch system of claim 1.

7. A crosspoint routing system that includes a plurality of the network PHY switch system of claim 1, the crosspoint routing system comprising:
a plurality of ports coupled to a backplane, each of the plurality of ports comprising a media access control (MAC) device and the PHY device, the PHY device comprising:
a MAC interface comprising a plurality of MAC interface outputs configured to transmit a respective plurality of MAC receive signals to the MAC device, each of the plurality of MAC interface outputs comprising the at least one of the network PHY switch systems; and
a physical medium dependent (PMD) interface comprising a plurality of PMD interface outputs configured to transmit a respective plurality of PHY transmit signals to the backplane, each of the plurality of PMD interface outputs comprising another of the network PHY switch systems.

8. The crosspoint routing system of claim 7, wherein the MAC interface further comprises a plurality of MAC interface inputs configured to receive the plurality of MAC transmit signals from the MAC device, and wherein the PMD interface further comprises a plurality of PMD interface inputs configured to receive the plurality of PHY receive signals from the backplane.

9. The crosspoint routing system of claim 8, wherein the multiplexer associated with each of the plurality of MAC interface outputs is configured to output the respective one of the plurality of MAC receive signals as one of the plurality of MAC transmit signals or one of the plurality of PHY receive signals in response to the selection signal, and wherein the multiplexer associated with each of the plurality of PMD interface outputs is configured to output the respective one of the plurality of PHY transmit signals as one of the plurality of MAC transmit signals or one of the plurality of PHY receive signals in response to the selection signal.

10. The crosspoint routing system of claim 7, wherein the MAC interface is configured to receive the plurality of MAC transmit signals and to transmit the plurality of MAC receive signals at a first data rate, and wherein the PMD interface is configured to receive the plurality of PHY receive signals and to transmit the plurality of PHY transmit signals at a second data rate that is greater than the first data rate.

11. The crosspoint routing system of claim 10, wherein the multiplexer associated with each of the plurality of PMD interface outputs is configured to output the respective one of the plurality of PHY transmit signals as one of the plurality of PHY receive signals in response to the selection signal in a retime mode absent a change of the respective one of the plurality of PHY receive signals from the second data rate to the first data rate.

12. A method for switching from a first data stream to a second data stream in a physical link (PHY) device of a network device, the method comprising:
providing a selection signal in a first state to select the first data stream that is input to the PHY device to be output from a multiplexer;
receiving a switching control signal that indicates a command to switch from the first data stream to the second data stream;
monitoring an output of a first-in-first-out (FIFO) buffer to detect a predetermined condition associated with the first data stream;
providing a trigger signal in response to detecting the predetermined condition associated with the first data stream; and
providing the selection signal in a second state to switch the input to the PHY device from the first data stream to the second data stream to be output from the multiplexer, wherein the first data stream and the second data stream correspond to one of a plurality of MAC transmit signals provided to the PHY device from a media access control (MAC) device or one of a plurality of PHY receive signals provided to the PHY device from a backplane to which the PHY device is connected.

13. The method of claim 12, further comprising:
replacing data at the output of the FIFO buffer with dummy data in response to the trigger signal;
monitoring the output of the FIFO buffer to detect a beginning of the second data stream; and
deactivating the trigger signal to provide the second data stream from an input associated with the PHY device to be output from the multiplexer in response to detecting the beginning of the second data stream at the output of the FIFO buffer.

14. The method of claim 12, wherein monitoring the output of the FIFO buffer comprises monitoring the output of the FIFO buffer to detect an end of a packet associated with the first data stream.

15. A crosspoint routing system comprising a physical link (PHY) device, the PHY device comprising:
a media access control (MAC) interface comprising a MAC interface output configured to transmit a MAC receive signal corresponding to one of a plurality of MAC transmit signals and a plurality of PHY receive signals to a MAC device via a MAC interface switch, and further comprising a MAC interface input configured to receive the plurality of MAC transmit signals from the MAC device; and
a physical medium dependent (PMD) interface comprising a PMD interface output configured to transmit a PHY transmit signal corresponding to one of the plurality of MAC transmit signals and the plurality of PHY receive signals to a backplane via a PMD interface switch, and further comprising a PMD interface input configured to receive the plurality of PHY receive signals from the backplane, wherein the PHY device is configured to switch from a first data stream to a second data stream, wherein the first data stream and the second data stream correspond to one of the plurality of MAC transmit signals or one of a plurality of PHY receive signals.

16. The system of claim 15, wherein each of the MAC interface switch and the PMD interface switch comprises:
a multiplexer configured to output the first data stream of a plurality of data streams that are input to the PHY device in response to a first state of a selection signal;
a data detector configured to monitor the first data stream and to provide a trigger signal in response to detecting a predetermined condition associated with the first data stream; and
a switching controller configured to provide the selection signal in one of the first state and a second state, and, in response to receiving a switching command signal that indicates a command to switch from the first data stream to the second data stream of the plurality of data streams, is configured to monitor the data detector for the trigger signal and to change the selection signal from the first state to the second state in response to receiving the trigger signal to switch from the first data stream to the second data stream.

17. The system of claim 16, further comprising a data mask component configured to discard the first data stream and to insert dummy data in place of the discarded first data stream in response to the trigger signal, wherein the data detector is further configured to deactivate the trigger signal in response to a predetermined condition associated with the second data stream to enable the second data stream to pass through the data mask component.

18. The system of claim 15, wherein the MAC interface is configured to receive the plurality of MAC transmit signals and to transmit the MAC receive signal at a first data rate, and wherein the PMD interface is configured to receive the plurality of PHY receive signals and to transmit the PHY transmit signal at a second data rate that is greater than the first data rate.

19. The system of claim 18, wherein the PMD interface switch is configured to output the PHY transmit signal corresponding to a first PHY receive signal of plurality of the PHY receive signals in a retime mode absent a change of the first PHY receive signal from the second data rate to the first data rate.

* * * * *